US008681004B2

(12) United States Patent
Pawlik et al.

(10) Patent No.: US 8,681,004 B2
(45) Date of Patent: Mar. 25, 2014

(54) DEACTIVATION OF A SECURITY FEATURE

(75) Inventors: Thomas D. Pawlik, Rochester, NY (US); Myra T. Olm, Webster, NY (US); Judith A. Bose, Webster, NY (US)

(73) Assignee: Eastman Kodak Company, Rochester, NY (US)

( * ) Notice: Subject to any disclaimer, the term of this patent is extended or adjusted under 35 U.S.C. 154(b) by 400 days.

(21) Appl. No.: 13/094,920

(22) Filed: Apr. 27, 2011

(65) Prior Publication Data

US 2012/0274467 A1 Nov. 1, 2012

(51) Int. Cl.

| | |
|---|---|
| ***G06K 7/10*** | (2006.01) |
| ***G06K 19/06*** | (2006.01) |
| ***G08B 13/14*** | (2006.01) |

(52) U.S. Cl.

USPC ..................... 340/572.3; 340/572.1; 235/454; 235/494

(58) Field of Classification Search

None

See application file for complete search history.

(56) References Cited

U.S. PATENT DOCUMENTS

| | | | | |
|---|---|---|---|---|
| 6,181,248 | B1 * | 1/2001 | Fockens | 340/572.3 |
| 2003/0116747 | A1 | 6/2003 | Lem et al. | |
| 2004/0000998 | A1 | 1/2004 | Karp | |
| 2007/0023521 | A1 * | 2/2007 | Wildey et al. | 235/454 |
| 2008/0299559 | A1 * | 12/2008 | Kwok et al. | 435/6 |
| 2009/0039161 | A1 * | 2/2009 | Matsushima | 235/454 |
| 2009/0218401 | A1 | 9/2009 | Moran et al. | |
| 2009/0277968 | A1 * | 11/2009 | Walker | 235/494 |
| 2009/0309733 | A1 * | 12/2009 | Moran et al. | 340/572.1 |
| 2010/0017330 | A1 * | 1/2010 | Tan | 705/50 |
| 2010/0025476 | A1 | 2/2010 | Widzinski, Jr. et al. | |

FOREIGN PATENT DOCUMENTS

WO WO 02/50790 A1 6/2002

* cited by examiner

*Primary Examiner* — George Bugg
*Assistant Examiner* — Renee Dorsey
(74) *Attorney, Agent, or Firm* — Nelson Adrian Bush

(57) ABSTRACT

A method to deactivate a security measure includes applying a first covert optically active security marker to a product or document; completing a transaction for the product or document; and applying a second optically active security marker to the product or document which indicates completion of the transaction.

17 Claims, 8 Drawing Sheets

DEACTIVATION OF A SECURITY FEATURE

CROSS REFERENCE TO RELATED APPLICATIONS

Reference is made to commonly-assigned copending U.S. patent application Ser. No. 13/094,931 (now U.S. Publication No. 2012/0275639), filed Apr. 27, 2011, entitled IMAGE ALGORITHMS TO REJECT UNDESIRED IMAGE FEATURES, by Widzinski et al.; and U.S. patent application Ser. No. 13/094,945 (now U.S. Publication No. 2012/0275640), filed Apr. 27, 2011 herewith, entitled METHOD OF AUTHENTICATING SECURITY MARKERS, by Widzinski et al.; the disclosures of which are incorporated herein.

FIELD OF THE INVENTION

The invention relates in general to traceless security marker and in particular to deactivating traceless security markers.

BACKGROUND OF THE INVENTION

It is sometimes useful to be able to deactivate a security measure during the production, distribution, sale (return), and disposal chain. For example, in retail, security tags that trigger a theft alarm at exit gates are deactivated at the point of sale. Return fraud occurs when items are stolen from a store and then returned for a refund, facilitated by lenient return policies, e.g. no receipt requirement.

It would be beneficial, therefore, to have a covert deactivation feature in the traceless system to identify an item that has rightfully been paid for. It is possible to remove or obscure the traceless signature by scratching off or adding an absorber, but these measures will likely leave visible marks.

Some reader based authentication systems expect the marker response of a marked item within both a low and a high limit. See commonly-assigned, copending U.S. patent application Ser. Nos. 13/094,931 and 13/094,945. A method and apparatus are needed to deactivate traceless systems.

SUMMARY OF THE INVENTION

Briefly, according to one aspect of the present invention a means to invalidate an item that is authenticated by an authentication reader is provided. The reader authenticates the item by detecting the presence of a security marker. The invalidation is done by adding an additional marker whose presence will trigger a "fail" response from the authentication reader. The fail response of the reader can be triggered by the transgression of a high limit, by not meeting shape requirements of the marker image (in case of an imaging reader) or by the presence of a different optical response from the added marker.

The present invention offers a way of deactivating, e.g., a hangtag by adding additional marker (via a spray, pen, or other applicator) such that the marked item will fail "high." Other possibilities are to add a marker that will trigger false positive aversion mechanisms of the reader, e.g. the shape detection, by adding fibers or flakes or marker specific rejection mechanisms by adding a marker with a different optical response.

The invention and its objects and advantages will become more apparent in the detailed description of the preferred embodiment presented below.

DETAILED DESCRIPTION OF THE INVENTION

The present invention will be directed in particular to elements forming part of, or in cooperation more directly with the apparatus in accordance with the present invention. It is to be understood that elements not specifically shown or described may take various forms well known to those skilled in the art.

Figure 1:
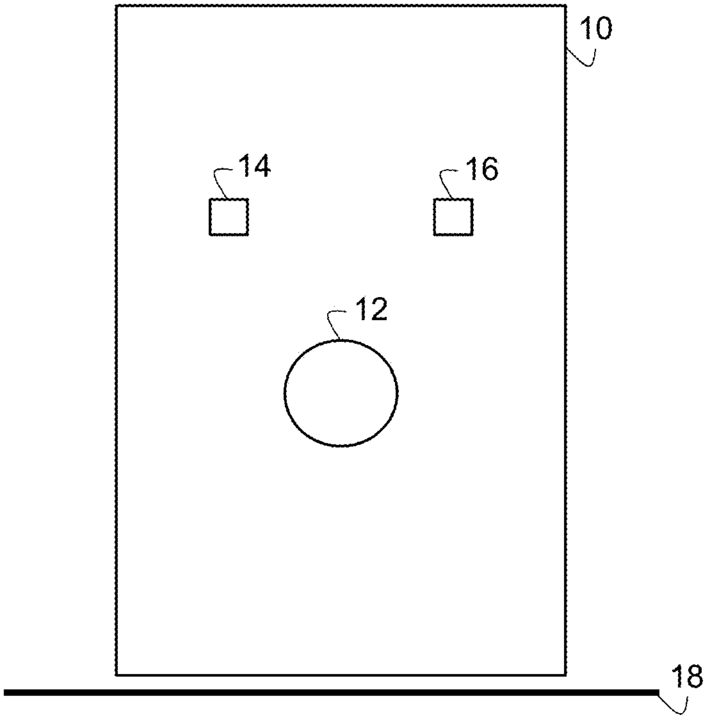
FIG. 1 shows a plan view of a security marker detection system.

Referring now to FIG. 1 which shows a block diagram of a security marker detection system 10 which can be used to detect emitted or reflected radiation from security marker materials, as required in this invention. FIG. 1 also shows the item to be authenticated 18. Authentication is performed by pressing the test button 12. The result is displayed by either a pass indicator light 14 or a fail indicator light 16.

Figure 2:
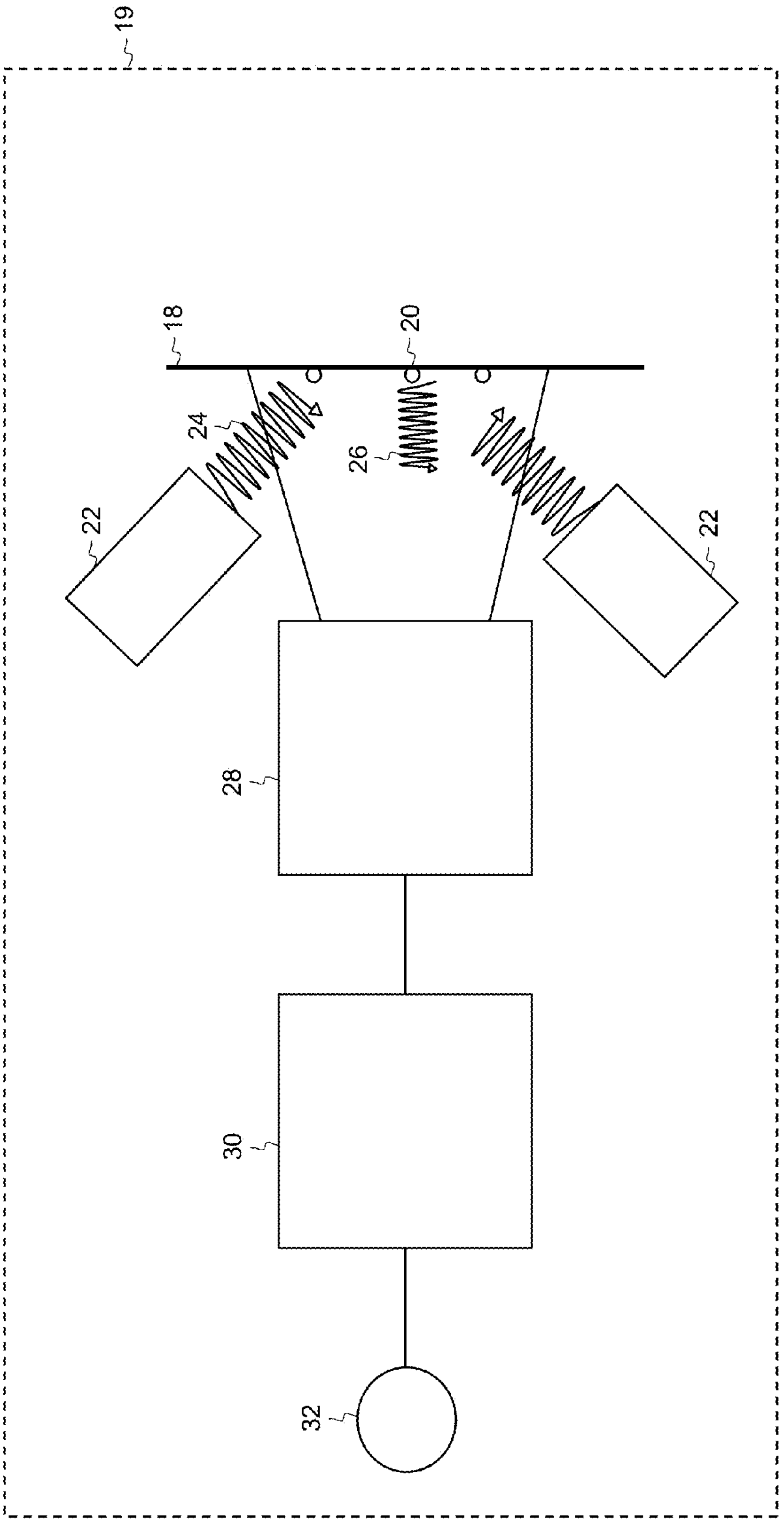
FIG. 2 shows a block diagram of a security marker detection system.

Referring now to FIG. 2 which shows a schematic representation of a security marker detection system 19 which can be used to detect emitted or reflected radiation from security marker materials in an image-wise fashion, as required in the present invention. One or more irradiation sources 22 direct electromagnetic radiation towards the item to be authenticated 18. The authentic item contains a random distribution of marker particles 20 either in an ink or in an overcoat varnish. The marker particles emit or reflect electromagnetic radiation 26 as a response to the radiation from the irradiation sources 22 which is detected by a camera 28. A microprocessor 30 analyzes the camera image and determines a pass or fail indication which is displayed on the authentication indicator 32.

Figure 3:
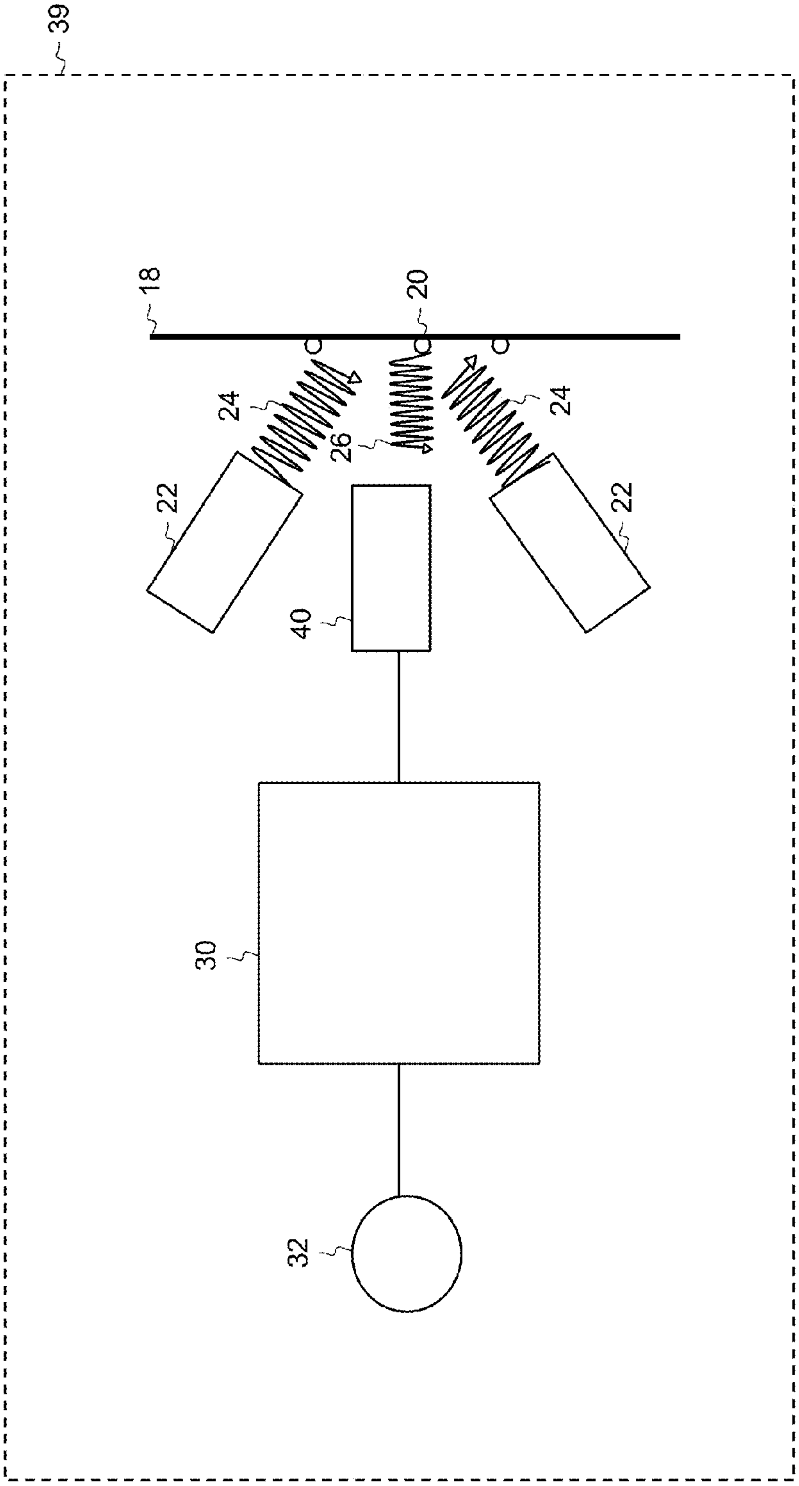
FIG. 3 shows an alternate embodiment of a security marker detection system.

Referring now to FIG. 3 which shows an alternate embodiment of a security marker detection system 39 which can be used to detect emitted or reflected radiation from security marker materials in a non image-wise fashion, as required in the present invention. One or more irradiation sources 22 direct electromagnetic radiation towards the item to be authenticated 18. The authentic item contains a random distribution of marker particles 20 either in an ink or in an overcoat varnish. The marker particles emit or reflect electromagnetic radiation 26 as a response to the radiation from the irradiation sources 22, which emits excited electromagnetic radiation 24, which is detected by a photodetector 40. A microprocessor 30 analyzes the photodetector response and determines a pass or fail indication which is displayed on the authentication indicator 32. Pass or fail indication can, for example, represent authentic/active and authentic/deactivated, respectively.

Figure 4:
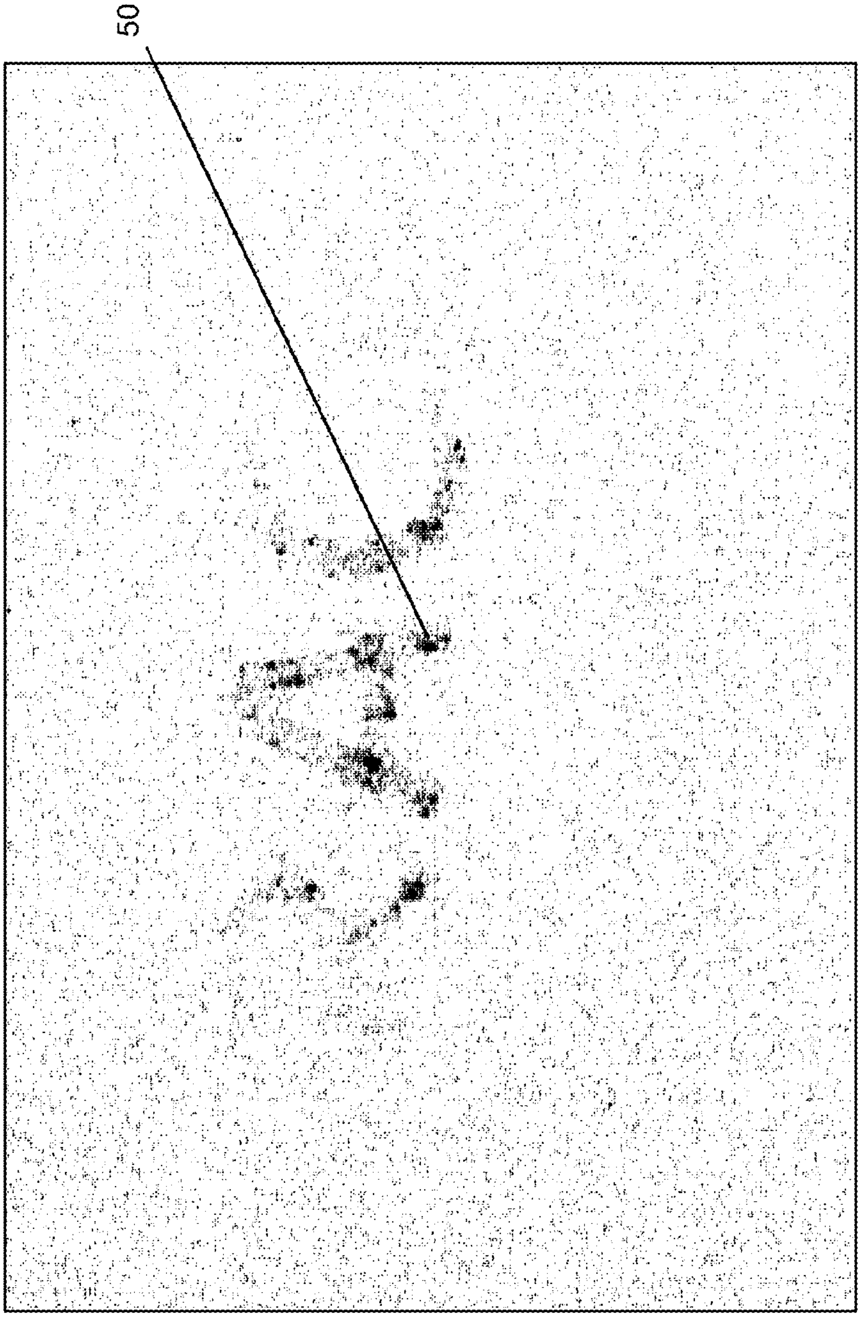
FIG. 4 shows an image of an authentic item.

Referring now to FIG. 4 which shows an image of an authentic item taken with an authentication reader 19 according to FIG. 2. The image contains a random distribution of marker particles 50 with low concentration. The authentication reader will pass this item as authentic/active because pass criteria for concentration of marker particles in the image are met. For a non-imaging authentication reader 39 according to FIG. 3, the pass criterion is based on the intensity of the photodetector signal 40. In this case the marked item will pass as authentic/active because the intensity of the photodetector signal 40 meets the pass criterion.

Figure 5:
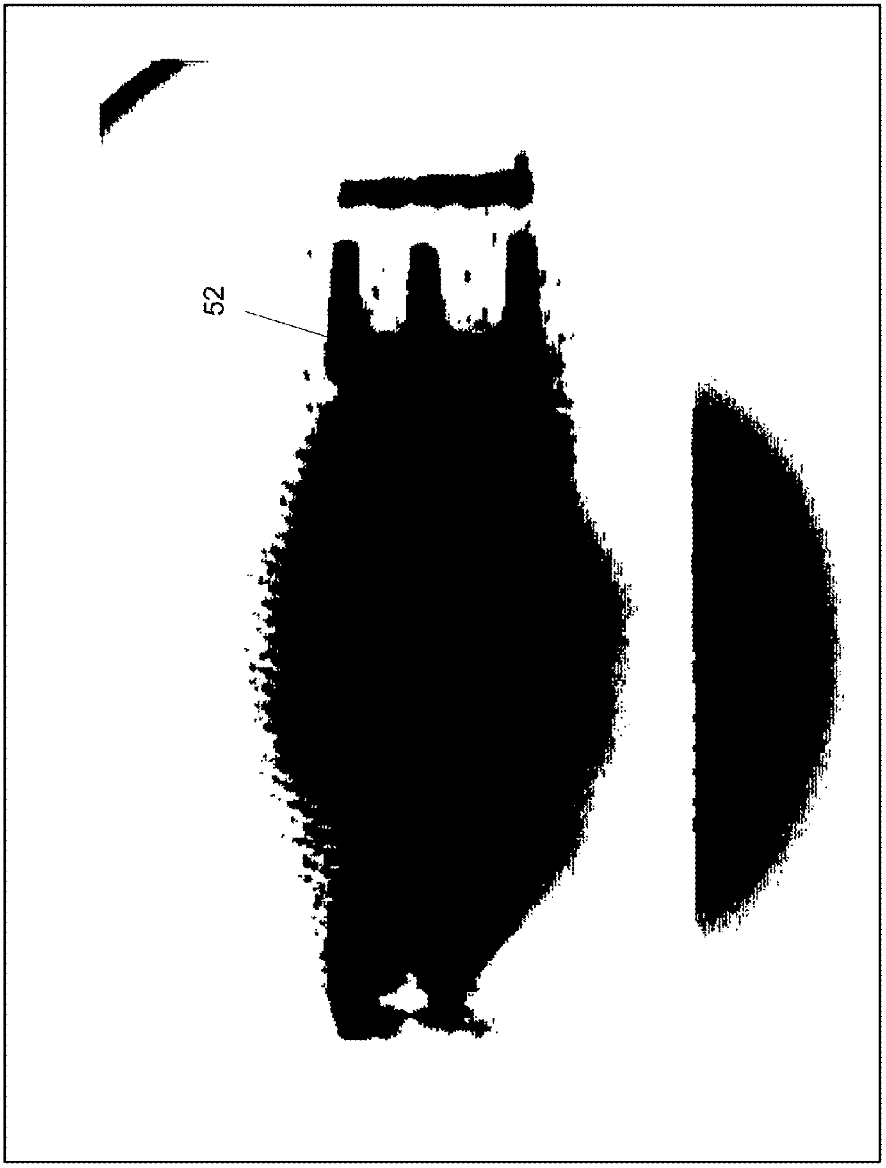
FIG. 5 shows an image of deactivated authentic item.

Referring now to FIG. 5 an image of an authentic item taken with an authentication reader 19 according to FIG. 2 is shown. The authentic marked item 18 was deactivated by adding marker particles 20. The resulting image contains a random distribution of marker particles 52 with high concentration. The authentication reader will interpret this item as authentic/deactivated because pass criteria for concentration of marker particles in the image are exceeded. For a non-imaging authentication reader 39 according to FIG. 3, the pass criterion is based on the intensity of the photodetector signal 40. In this case the marked item will be interpreted as authentic/deactivated because the intensity of the photodetector signal 40 exceeds the pass criterion.

Figure 6:
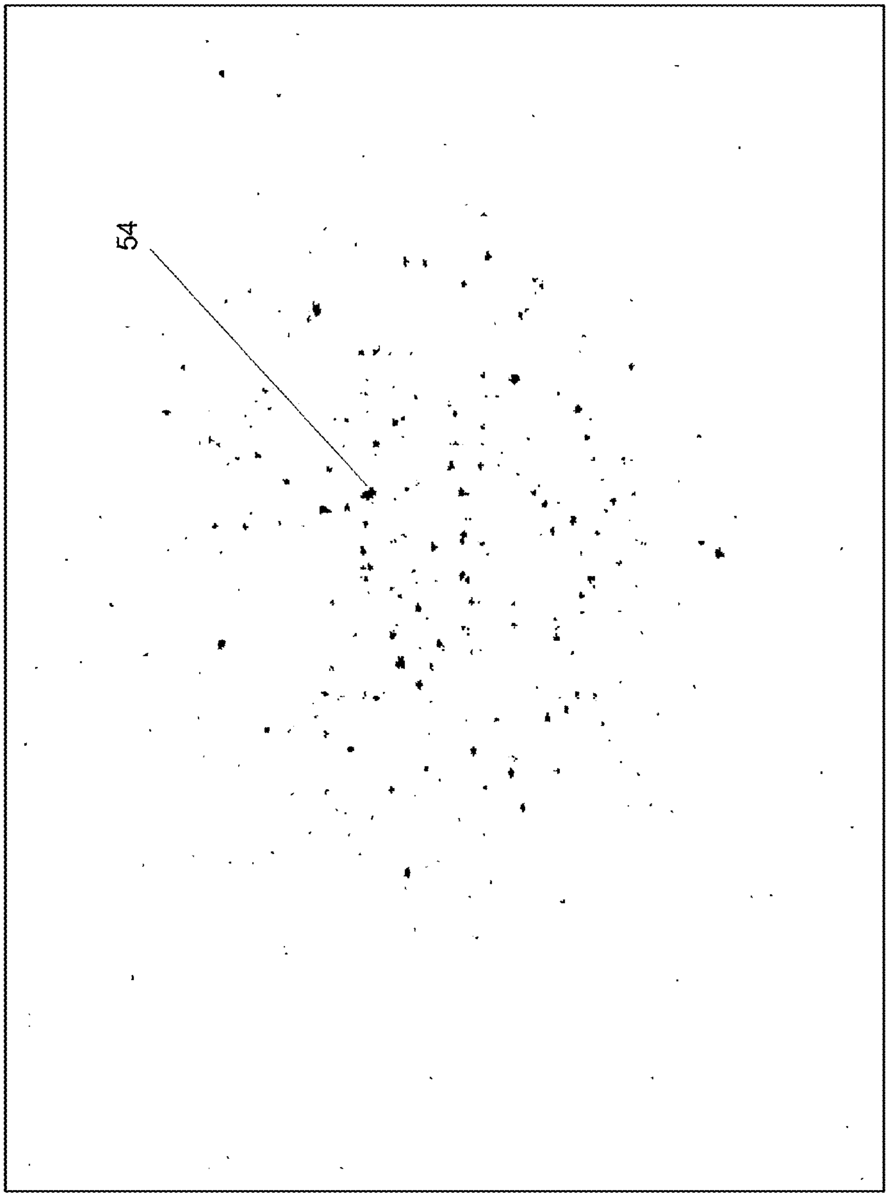
FIG. 6 shows an image of an authentic item.

Referring now to FIG. 6 which shows an image of an authentic item taken with an authentication reader 19 according to FIG. 2. The image contains a random distribution of marker particles 54 with low spatial density. The authentication reader will pass this item as authentic/active because pass criteria for concentration of marker particles and spatial density of the image are met.

Figure 7:
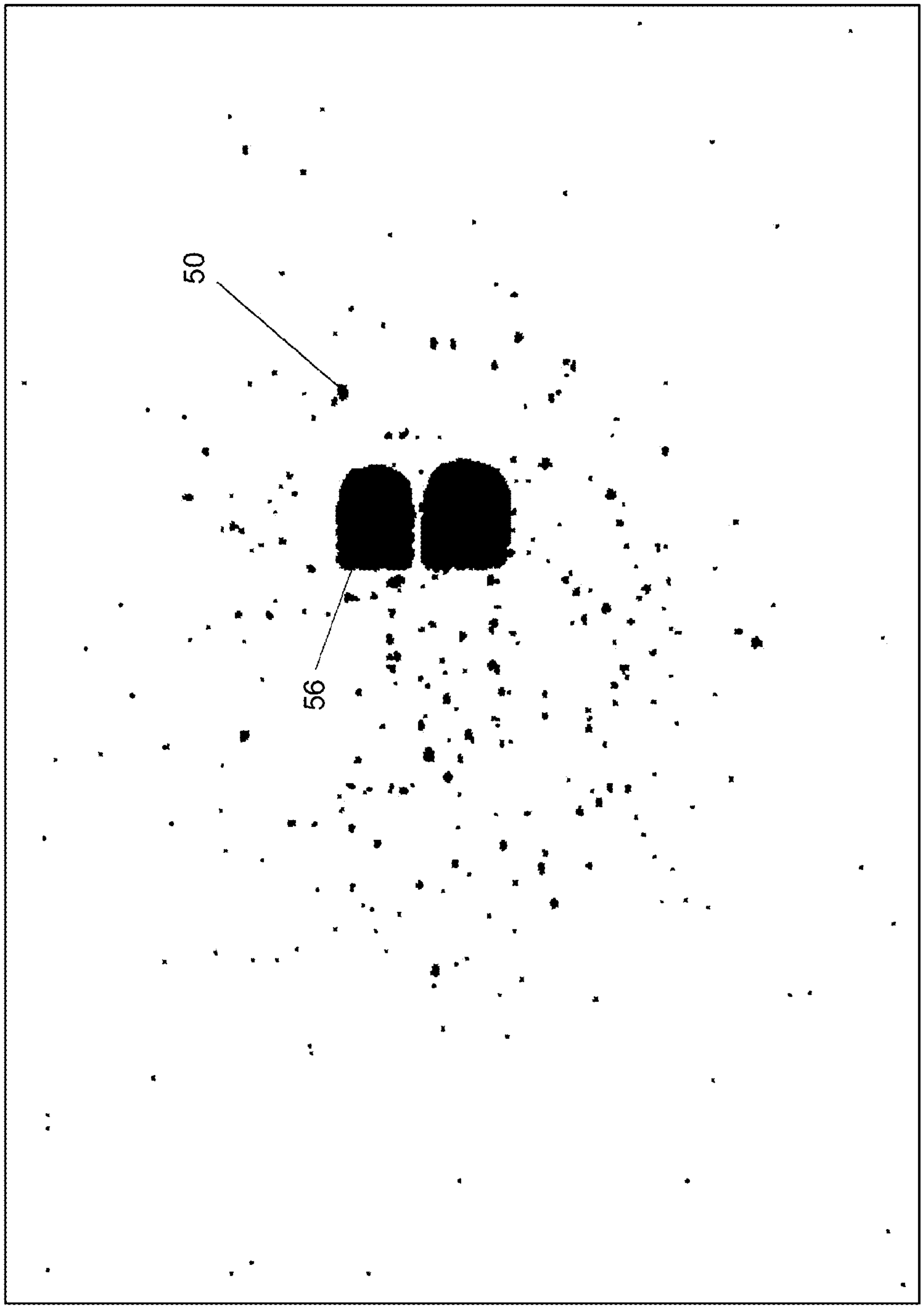
FIG. 7 shows an image of deactivated authentic item.

Referring now to FIG. 7 which shows an image of an authentic item taken with an authentication reader 19 according to FIG. 2. The authentic marked item 18 was deactivated by adding marker particles in a solid contiguous pattern. The resulting image contains an area within the image of marker particles with high spatial density 56. The authentication reader will interpret this item as authentic/deactivated because pass criteria for spatial density of the marker image are not met.

Figure 8:
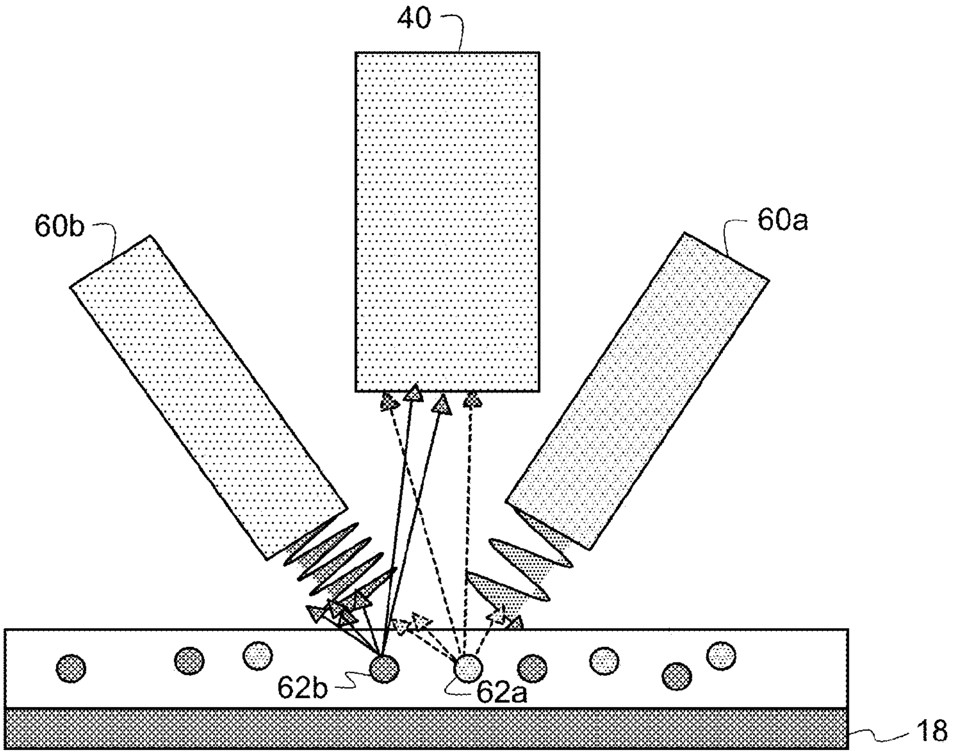
FIG. 8 shows a schematic of optoelectronic components of a security marker detection system.

Referring now to FIG. 8 which shows a schematic of an optoelectronic components of a security marker detection system 39 which can be used to detect emitted or reflected radiation from security marker materials in a non image-wise fashion as shown in FIG. 3. The optoelectronic components consist of irradiation sources 60*a* and 60*b* that generate different wavelengths of electromagnetic radiation, and a photodetector 40. The irradiation sources are directed towards a marked item 18 that contains marker particles 62*a* and 62*b* that respond to irradiation sources 60*a* and 60*b*, respectively by emitting or reflecting light. This light is captured by a photodetector. As required in the present invention, the authentication system is designed such that the authentication reader will pass the item as authentic/active when response from marker particle 60*a* is detected. To deactivate the sample, marker particles 60*b* are added to the marked item 18. The authentication reader will then fail the item as authentic/deactivated when the presence of marker particle 60*b* is detected. It is noted that this situation is clearly distinguished from a case where no marker particles are present at all, or where only marker particle 60*b* is present. These situations can be reported as non-authentic.

The invention has been described in detail with particular reference to certain preferred embodiments thereof, but it will be understood that variations and modifications can be effected within the scope of the invention. For example, markers used to produce marked items include inorganic phosphors and pigments and organic dyes. Markers can be authenticated based on either their emissive or absorptive response to stimulating radiation.

PARTS LIST

10 security marker detection system
12 button to initiate authentication
14 authentication indicator pass
16 authentication indicator fail
18 marked item to be authenticated
19 authentication device employing image-wise detection
20 security marker particle
22 irradiation source
24 exciting electromagnetic radiation
26 emitted electromagnetic radiation
28 camera
30 microprocessor
32 authentication indicator
39 authentication device employing non image-wise detection
40 photodetector
50 marker particle (low concentration)
52 marker particle (high concentration)
54 marker particle (low spatial density)
56 marker particle (high spatial density)
60*a* irradiation source 1
60*b* irradiation source 2
62*a* marker particle 1
62*b* marker particle 2

The invention claimed is:

1. A method to deactivate a security measure comprising:
applying a first covert optically active security marker to a product or document;
completing a transaction for the product or document; and
applying a second optically active security marker to the product or document which indicates completion of the transaction.

2. The method as in claim 1 wherein the second optically active security marker is a covert marker.

3. The method as in claim 1 wherein the second security marker completely covers the first security marker.

4. A method to deactivate a security measure comprising:
applying a first covert optically active security marker to a product or document;
completing a transaction for the product or document;
applying a second optically active security marker to the product or document which indicates completion of the transaction;
wherein a security reader detects the first and second security markers comprising:
indicating a pass when the first security marker is detected; and
indicating a fail when the second security marker is detected.

5. The method as in claim 1 wherein a composition of the first security marker and the second security marker is the same.

6. A method to deactivate a security measure comprising:
applying a first covert optically active security marker to a product or document;
completing a transaction for the product or document;
applying a second optically active security marker to the product or document which indicates completion of the transaction; and
wherein a composition of the first security marker and the second security marker is different.

7. The method as in claim 6 wherein a security reader detects differences in wavelength of emission or duration of emission from the first security marker and the second security marker.

8. The method as in claim 6 wherein a security reader detects differences in size or shape of the particles in the first security marker and the second security marker.

9. The method as in claim 5 wherein a security reader indicates a failure if a level of the composition is over a predetermined limit based on the superposition of the first security marker and the second security marker.

10. The method as in claim 1 wherein the first and second security markers are applied to a label, price tag, hangtag, package, carton, or garment tag of the product or document.

11. The method as in claim 1 wherein the document comprises a passport, visa, or ticket.

12. A method to deactivate a security measure comprising:

applying a first covert optically active security marker to a product or document;

completing a transaction for the product or document;

applying a second optically active security marker to the product or document which indicates completion of the transaction; and wherein the second security marker is applied by a stamp pad, a pen, or a printer.

13. The method as in claim 1 wherein the transaction includes a sale, entry into an event, or entry into a country.

14. The method as in claim 1 wherein a first reader detects the first security marker and a second reader detects the second security marker.

15. The method as in claim 1 wherein a reader detects both the first and second security markers.

16. The method as in claim 8 wherein a spatial density of a first security marker is different than the spatial density of the second security marker.

17. A method to deactivate a security measure comprising:

applying a first covert optically active security marker to a product or document; and applying a second optically active security marker to the product or document which indicates the completion of a transaction for the product or document.

* * * * *